(No Model.) 3 Sheets—Sheet 1.

A. HEUSCH.
MEAT CHOPPING MACHINE.

No. 332,608. Patented Dec. 15, 1885.

Witnesses:
Frank J Blanchard
Louis Nolting

Inventor:
Anton Heusch
By Wm N Lotz & Co.
Attorneys.

(No Model.) 3 Sheets—Sheet 3.

A. HEUSCH.
MEAT CHOPPING MACHINE.

No. 332,608. Patented Dec. 15, 1885.

Witnesses:
Frank G. Blanchard
Louis Nolting

Inventor
Anton Heusch
By W. H. Lotz & Co.
Attorneys

UNITED STATES PATENT OFFICE.

ANTON HEUSCH, OF CHICAGO, ILLINOIS.

MEAT-CHOPPING MACHINE.

SPECIFICATION forming part of Letters Patent No. 332,603, dated December 15, 1885.

Application filed March 31, 1885. Serial No. 160,803. (No model.)

*To all whom it may concern:*

Be it known that I, ANTON HEUSCH, a subject of the King of Holland, residing at Chicago, in the county of Cook and State of Illinois, have invented certain new and useful Improvements in Meat-Chopping Machines, of which the following is a specification, reference being had therein to the accompanying drawings.

My invention relates to an improved meat-chopper.

The object I have in view is to improve such devices in order that they may perform their functions thoroughly and perfectly; and to the accomplishment of that end the invention consists of certain novel devices and combination of devices, as will be described and claimed.

Figure 1:
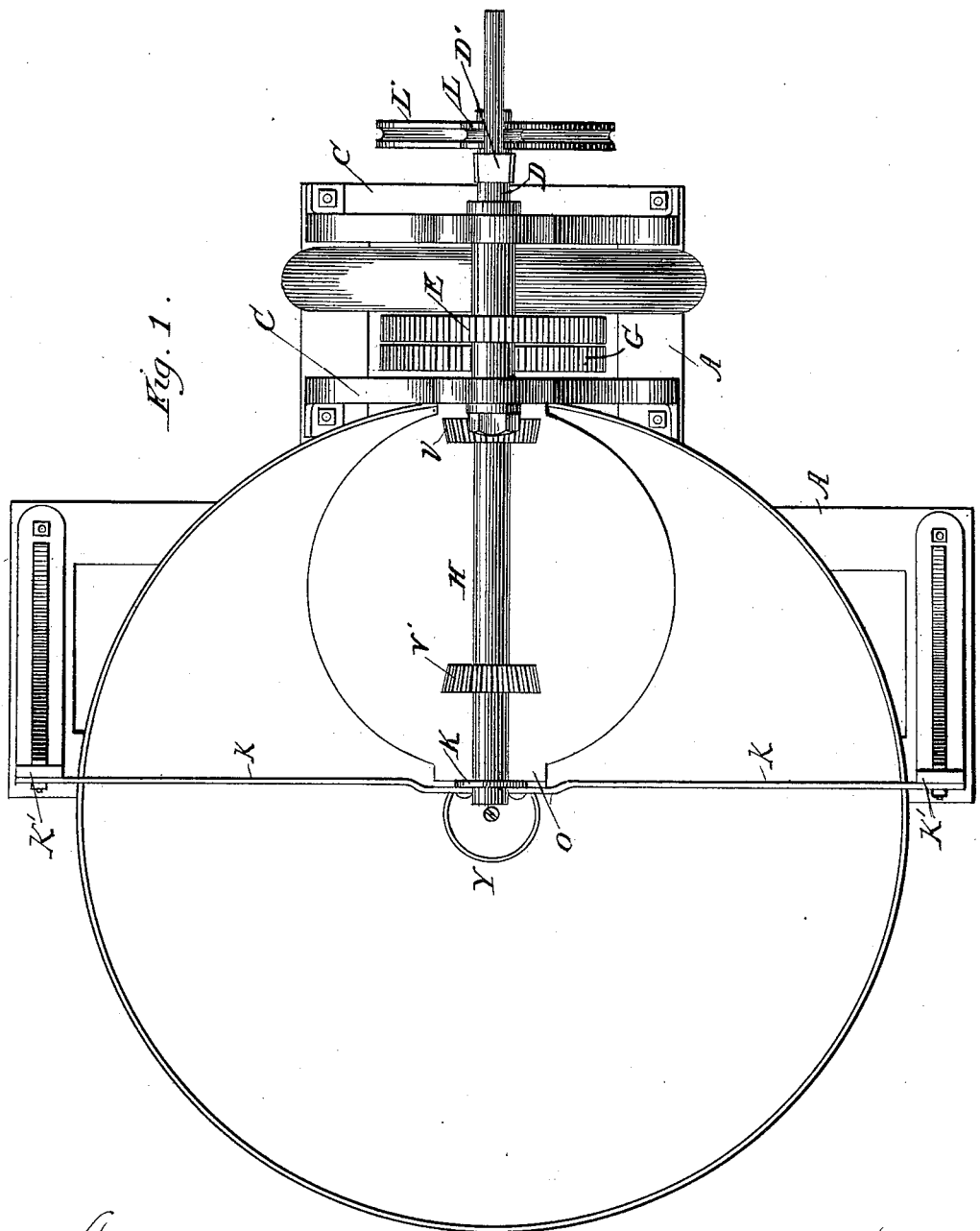
Figure 2:
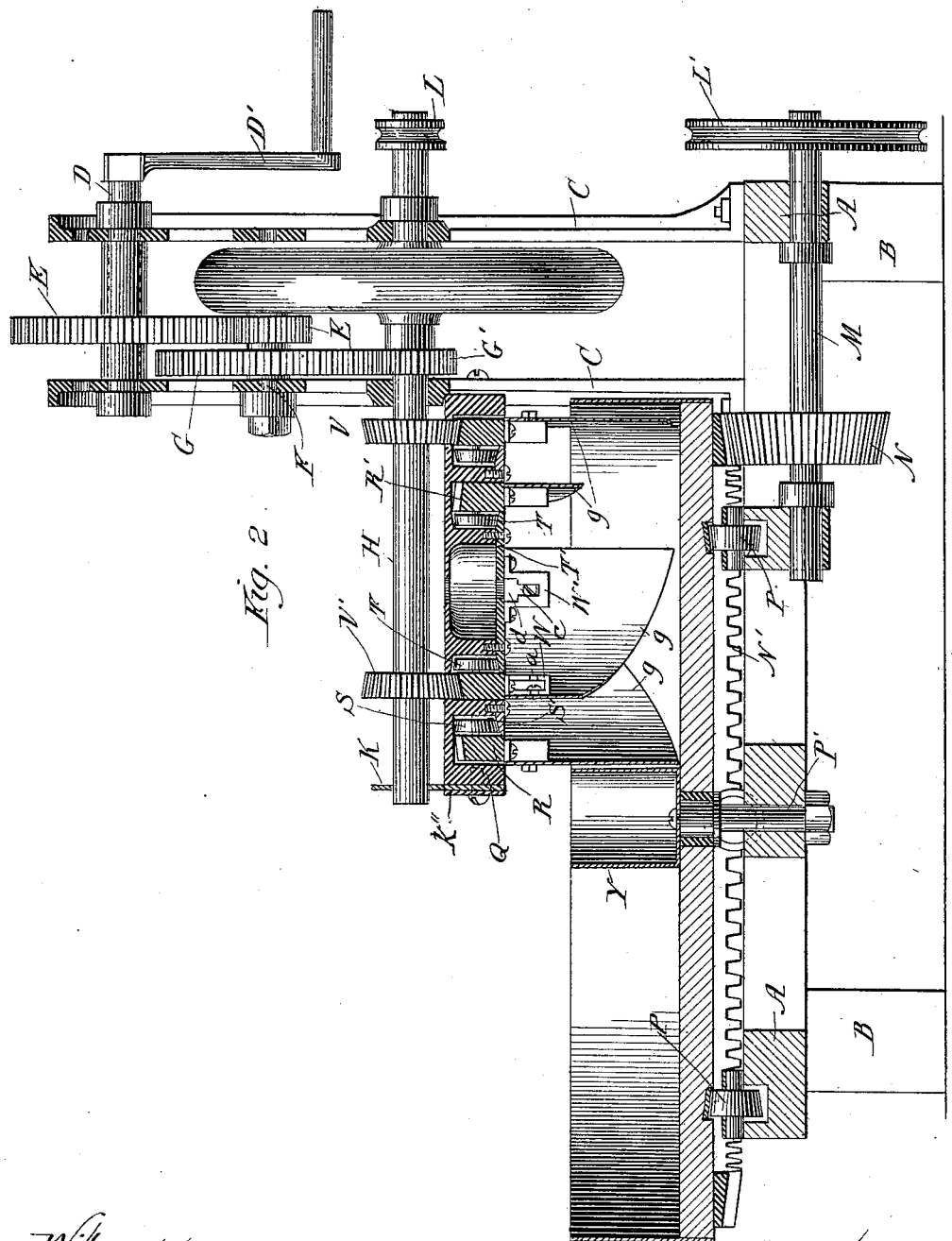
Figure 3:
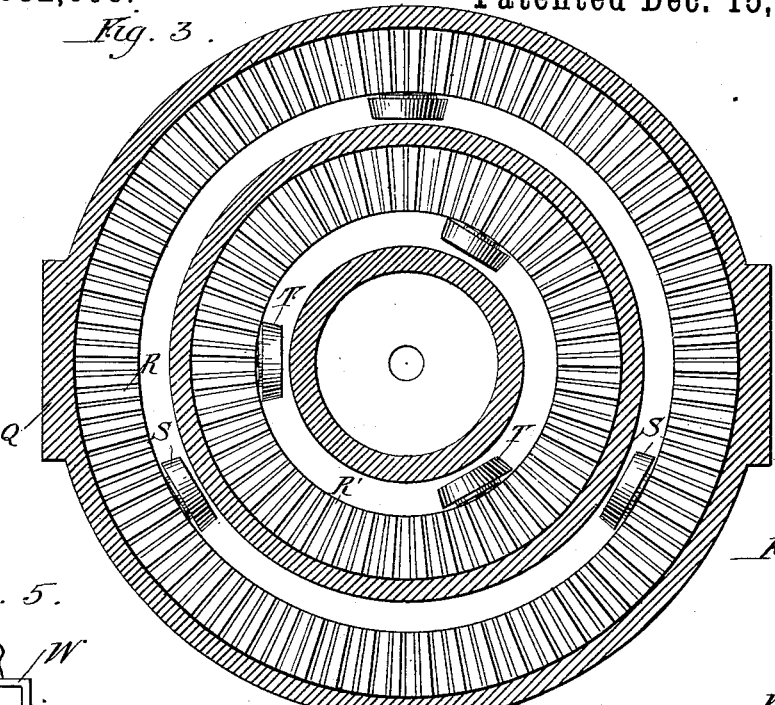
Figure 5:
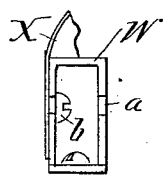
Figure 6:
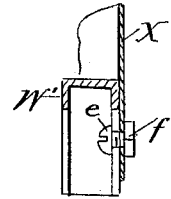
Figure 4:
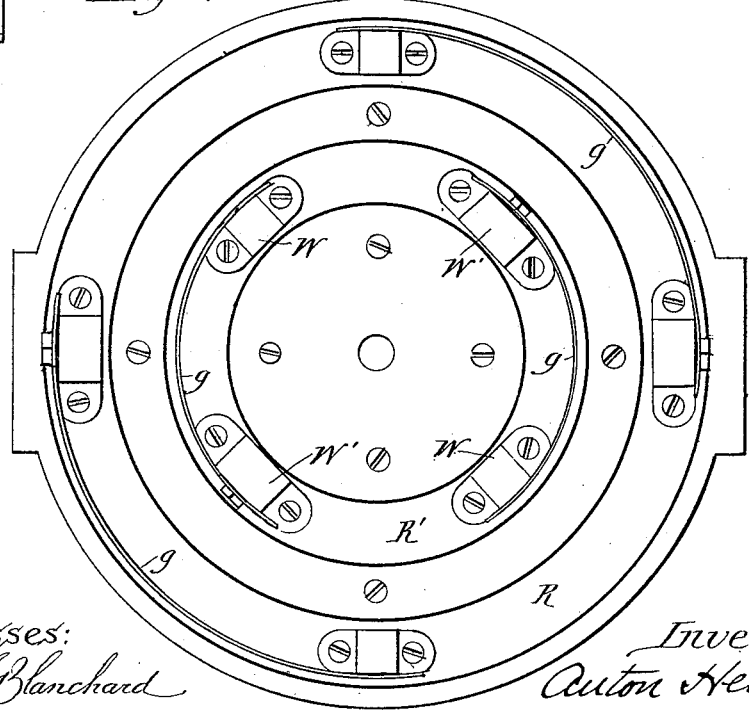

Reference will be made to the accompanying drawings, in which Figure 1 is a top plan view of the entire device; Fig. 2, a longitudinal section therethrough; Fig. 3, a detail of the mechanism for operating the cutters; Fig. 4, a bottom plan of the cutters and their carrying-frames, and Figs. 5 and 6 details of manner of securing cutters in position.

Like letters refer to like parts in each view.

A represents a frame supported upon legs B, and adapted to carry the operative parts of the machine. Mounted upon the rear end of frame A are two uprights, C, in which several shafts, now to be referred to, have bearings, said uprights being situated a suitable distance apart, as clearly shown in Fig. 2. Mounted in uprights C at a point near their upper ends is a shaft, D, provided upon its outer end with a crank, D', by which it is operated. Keyed to this shaft is a cog-wheel, E, which meshes with and operates a smaller cog-wheel, E', mounted upon a stud, F, which has bearing in the forward upright, C. Keyed to stud F is a second cog-wheel, G, meshing with a cog-wheel, G', keyed to a shaft, H, which has bearings in uprights C, and also extends forward and has bearing in a piece, K, bolted to a block, Q, to be referred to, and cross-pieces K², as shown in Figs. 1 and 2, the latter mounted at each outer end in suitable uprights, K', supported upon frame A. Shaft H also protrudes slightly to the rear of the rear upright, C, and is provided with a pulley, L, as shown clearly. A suitable endless belt (not shown) is passed around pulley L, and also around a larger pulley, L', keyed to a shaft, M, which has bearing in the cross-pieces of frame A. This belt-connection for shaft M may be made with shaft D, if desired, and, in fact, such an arrangement is preferable, as the receptacle operated by shaft M, as will be described, should not be revolved at a very high rate of speed. Keyed to shaft M at a point near its inner end is a pinion, N, arranged to mesh with a rack, N', formed upon the lower face of a circular meat-receptacle, O. Upon the lower face of receptacle O, and within the circle formed by rack N', there is provided a guideway, into which anti-friction rollers P enter as the receptacle is revolved, such rollers being mounted in suitable bearing-boxes located upon the frame A. Mounted in one cross-piece of frame A is a pin, P', which passes up through receptacle O at its center and forms the pivot-point for such receptacle.

Q represents a circular block adapted to carry the knife-carrying frames R R', said frame being supported upon the forward upright C and the cross-piece K, hereinbefore referred to, thus occupying a point above the revolving meat-receptacle O between its center and circumference. Formed upon the under face of block Q, at a point near its outer circumference, is an annular groove, into which the knife-carrying frame R is inserted and adapted to move. Secured to the inner circumference of frame R are a series of studs, upon which rollers S are mounted, such rollers adapted to move upon a strip, S', Fig. 2, bolted to the under side of block Q and overlapping the annular groove with which such block is provided, as above described, a sure support being thus provided for rollers S and the frame to which they are secured. A second annular groove is formed in block Q, within the circle of the one first referred to, and adapted to accommodate the second knife-carrying frame, R'. Frame R' is also provided with a series of rollers, T, which move upon a way formed by a strip, T', bolted to the under face of block Q, as shown clearly in Fig. 2. Each frame R R' is formed upon its upper face with a suitable rack, with which bevel-gears V V' are adapted to mesh, such gears passing through suitable openings formed in the upper face of block Q for that purpose, and said gears being keyed to the forward extension of shaft H, hereinbefore referred to. Gear V is so situated as to have its bevel facing toward the front of the machine, and gear V' with its bevel facing the rear thereof, this arrangement serving to turn the frames R R' in opposite directions.

In the description and illustration of the device I will refer to but two sets of knives and to two in each set; but it will be understood that more or less could be used, if desired. Secured by suitable bolts to the under side of each frame R R' are two pieces, W W', adapted to carry the knives X. Piece W is rectangular in form, and upon one edge of two of its sides it is provided with a notch, $a$, Fig. 5, into which a headed stud, $b$, is inserted. Stud $b$ is riveted to one end of the knife, and when it is inserted into notch $a$ that end of the knife is held firmly in position by the head of the stud pressing against the side of the piece W. Piece W' is also rectangular in form, and is provided upon two diametrically-opposite faces with a vertical opening, $c$, extending from a point slightly above the lower end of the piece up to within a short distance of its top, where it is enlarged, as at $d$, Fig. 2. The head of a screw-threaded bolt, $e$, is inserted through this enlargement, and the bolt then forced downward until this head presses against the inner face of piece W' with the screw-threaded end of the bolt protruding through slot $c$. The screw-threaded end of the bolt is then passed through an opening formed in the knife and the parts held in position by a nut, $f$. The knives X are preferably of the shape shown in Fig. 2. As therein shown, each is bent to form the segment of a circle, and one end, which is the forward end, is made less in height than the rear end, the cutting-edge, which is at $g$, being thus formed on an incline. A hollow cap, Y, is placed at the center of the receptacle O, as shown in Fig. 2.

The operation of the device is as follows: The meat to be operated upon is placed in the receptacle O and the crank of shaft D operated. As this shaft is operated motion is imparted through the line of gearing described to the cutting-knives and the receptacle O also caused to revolve. In this manner the meat in receptacle O is fed to the knives, and by them is thoroughly cut, the meat being fed to the knives until it is cut to the fineness desired.

I am aware that it is not new to use in a meat-chopping machine a revolving meat-receptacle, and also that knives suitably mounted and revolved around a common axis are not new, and therefore I do not claim such features; but

What I claim is—

1. In a meat-chopping machine, the combination, with a meat-receptacle, two cutter-carrying frames, and supports for the same, of two series of cutters mounted in such frames, and suitable gearing for revolving such cutters and frames in opposite directions with respect to each other, as set forth.

2. In a meat-chopping machine, in combination with a meat-receptacle, gearing for revolving it, two cutter-carrying frames, and supports for the same, of two series of cutters mounted in such frames, and suitable gearing for revolving such cutters and frames in opposite directions with respect to each other, as set forth.

3. In a meat-chopping machine, the combination, with a meat-receptacle, of two circular cutter-carrying frames, one situated within the circle formed by the other, supports for such frames, a series of cutters secured to each frame, and suitable gearing for revolving such frames in opposite directions with respect to each other, as set forth.

4. In a meat-chopping machine, the combination of two circular cutter-carrying frames, each provided with friction rollers, and one situated within the circle formed by the other, supports for such frames, a series of cutters secured to each frame, and suitable gearing for revolving such frames in opposite directions with respect to each other, as set forth.

5. In a meat-chopping machine, the combination, with a meat-receptacle, of two circular cutter-carrying frames, one situated within the circle formed by the other, supports for such frames, each of said frames being provided on its lower face with two pieces, W W', cutters removably secured to such pieces, and gearing for revolving such frames and knives in opposite directions with respect to each other, as set forth.

In testimony whereof I affix my signature in presence of two witnesses.

ANTON HEUSCH.

Witnesses:
M. J. CLAGETT,
HARRIS W. HUEHL.